June 18, 1963 F. J. POTTER 3,094,660

TEST CIRCUIT FOR DETERMINING DYNAMIC TRANSISTOR CHARACTERISTICS

Filed Nov. 1, 1961

INVENTOR.
FRANK J. POTTER
BY George J. Seligsohn
ATTORNEY

United States Patent Office 3,094,660

Patented June 18, 1963

3,094,660

TEST CIRCUIT FOR DETERMINING DYNAMIC TRANSISTOR CHARACTERISTICS

Frank J. Potter, Penfield, N.Y., assignor to General Dynamics Corporation, Rochester, N.Y., a corporation of Delaware Filed Nov. 1, 1961, Ser. No. 149,249
6 Claims. (Cl. 324—158)

This invention relates to a transistor test circuit and, more particularly, to a transistor test circuit for determining inherent dynamic characteristics of a transistor under test.

It is known that a conducting transistor has a certain charge stored therein, and when it is attempted to render the transistor nonconducting, this charge must be dissipated before the transistor actually is rendered nonconducting.

It is further known that the total charge stored in a conducting transistor consists of the sum of first, second and third component charges. The first component charge depends only on the collector current through the transistor. The ratio of this first component charge to the collector current, which has the units of time, is an inherent dynamic characteristic of the transistor which has been designated the dynamic unsaturated collector time constant of the transistor.

The second component of charge depends only upon the collector base back biasing voltage applied to the transistor. The ratio of the second component of charge to the collector base back biasing voltage, which has the units of capacity, is also an inherent characteristic of the transistor which has been designated the signal collector capacity of the transistor.

The third component of charge is zero if the transistor is unsaturated. However, if the transistor is saturated, the third component of charge depends on both the collector current and the degree of saturation. The ratio of the third component of charge to the collector current, which has units of time, is at any given degree of saturation an inherent characteristic of the transistor, which has been designated the dynamic saturated time constant of the transistor at the given degree of saturation.

It is, therefore, an object of this invention to provide a test circuit for determining the dynamic unsaturated time constant of a transistor under test.

It is a further object of this invention to provide a test circuit for determining the collector signal capacity of a transistor under test.

It is a further object of this invention to provide a test circuit for determining the dynamic saturated time constant of a transistor under test at any degree of saturation.

These and other objects, features and advantages of the present invention will become apparent from the following detailed description when taken together with the accompanying drawing in which.

Figure 1:
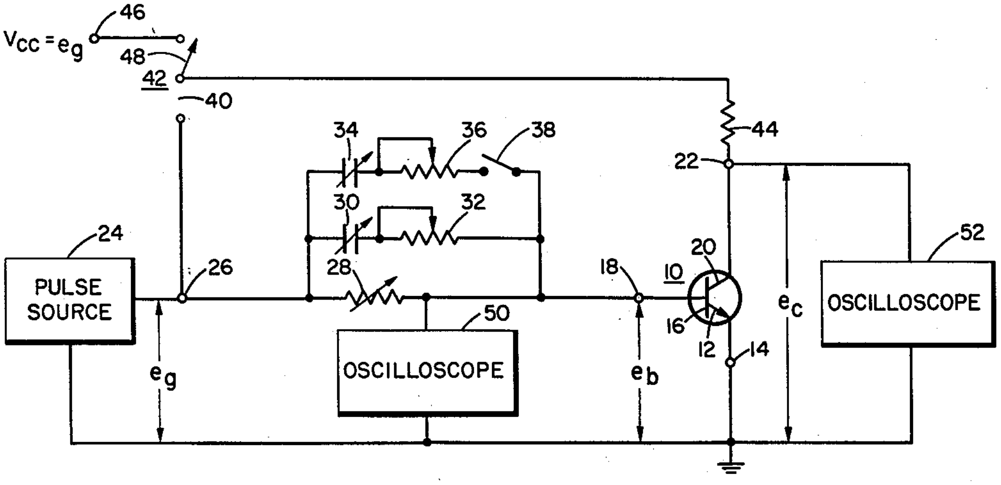
FIG. 1 is a schematic circuit diagram of a preferred embodiment of the present invention.

Referring now to FIG. 1, there is shown a transistor under test 10 having its emitter electrode 12 connected to terminal 14, its base electrode 16 connected to terminal 18 and its collector electrode 20 connected to terminal 22.

The output of repetitive pulse source 24 is connected between terminal 26 and terminal 14. Terminal 26 is connected to terminal 18 through calibrated adjustable resistance 28. Shunting resistance 28 is calibrated adjustable capacitance 30 in series with adjustable resistance 32. Also shunting resistance 28 is calibrated adjustable capacitance 34 in series with adjustable resistance 36 and single pole, single throw switch 38.

Terminal 26 may be connected to terminal 22 through contacts 40 of single pole, double throw switch 42 and resistance 44, which has a predetermined value.

Terminal 46 may be connected to terminal 22 through contacts 48 of single pole, double throw switch 42 and resistance 44. A fixed potential $V_{cc}$ is applied to terminal 46.

During the presence of a pulse, pulse source 24 provides an output voltage of a given magnitude $e_g$ and of a given polarity between terminals 26 and 14 to forward bias base 16 of transistor 10 with respect to emitter 12 thereof. The magnitude of potential $V_{cc}$ is equal to $e_g$.

Oscilloscope 50 is connected between terminals 18 and 14 to indicate the base emitter voltage $e_b$ as a function of time and oscilloscope 52 is connected between terminals 22 and 14 to indicate the collector emitter voltage $e_c$ as a function of time.

In operation, contacts 40 of single pole, double throw switch 42 are closed so that both the collector potential and the base potential are supplied from pulse source 24. The steady state collector potential $e_c$ and the base potential $e_b$ achieved during each pulse from the pulse source 24 are observed on oscilloscope 52 and oscilloscope 50, respectively, and calibrated resistance 28 is adjusted to a first value thereof which makes the collector potential $e_c$ equal to the base potential $e_b$. At this point, the transistor is operating very close to the edge of saturation, but is still unsaturated.

Then with single pole, single throw switch 38 open and resistance 32 adjusted to a minimum value, calibrated capacitance 30 is adjusted to a first value thereof such that during a pulse, the collector potential $e_c$ reaches the steady state value thereof in a minimum time without overshooting the steady state value thereof.

Figure 2:
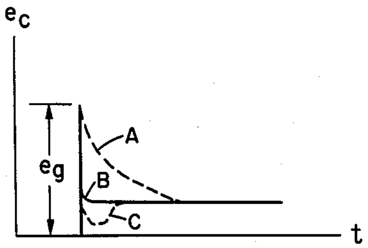
FIG. 2 is a graph showing the transient response of the collector potential as a function of time in response to the transistor being switched from a nonconducting state to a conducting state.

Referring to FIG. 2, there is shown a graph of the collector potential $e_c$ as a function of time for various settings of capacitance 30 as the transistor is turned on in response to a pulse from pulse source 24. Before a pulse is initiated, the collector potential $e_c$ is zero.

In response to the initiation of a pulse, the collector current cannot reach its steady state value until the first component of charge, discussed above, has been injected into the base of the transistor. With capacitance 30 set to a minimum value thereof, it takes an appreciable amount of time to inject this first component of charge. Therefore, as shown in curve A of FIG. 2, in response to the leading edge of a pulse, the collector potential $e_c$ jumps up to a magnitude equal to $e_g$ and then relatively slowly drops to its steady state value as the collector current builds up.

When capacitance 30 is adjusted to its first value, discussed above, capacitance 30 injects a charge into transistor 10 just equal to the required first component of charge. Therefore, as shown in curve B of FIG. 2, the collector potential $e_c$, after rising to a magnitude $e_g$ in response to the leading edge of a pulse, will fall practically immediately to its steady state value. There will still be a very short time delay caused by the modulation of the resistivity of the base region from a state of no conduction to a state of high conduction.

Capacitance 30 will inject a charge into transistor 10 which is greater than the required first component of charge if the value thereof is greater than the first value thereof. This will cause the collector potential $e_c$ to momentarily drop below the steady state value thereof, as shown in curve C of FIG. 2.

Thus, it will be seen that when capacitance 30 is adjusted to the first value thereof, the injected charge is equal to the first component of charge required by transistor 10. If the charge across capacitance 30, when it is set to the first value thereof, is designated $Q_b$, the collector current is designated $I_c$ and the dynamic unsaturated time constant is designated $t_c$, then $$Q_b=C_{30}(e_g-e_b)$$

$$I_c=\frac{e_g-e_c}{R_{44}}$$

However, the steady state value of $e_b$ has been set equal to the steady state value of $e_c$. Therefore, $$t_c=\frac{Q_b}{I_c}=\frac{C_{30}(e_g-e_b)}{\frac{e_g-e_c}{R_{44}}}=R_{44}C_{30}$$

It has been found that $Q_b$ is a linear function of $I_c$. Therefore, $t_c$ is an inherent characteristic of the transistor under test which is independent of $I_c$.

In order to determine the second component of charge, the adjustment of capacitance 30 is left at the first value thereof, contacts 48 of single pole, double throw switch 42 are closed and single pole, single throw switch 38 is closed. Then, by observing oscilloscope 50, capacitance 34 is adjusted to a first value thereof and resistances 32 and 36 are adjusted to values thereof which cause the base emitter voltage $e_b$ to fall to zero voltage in a minimum time without overshoot following the termination of a pulse, as shown in curve F of FIG. 3.

Figure 3:
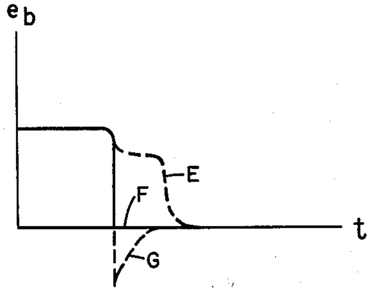
FIG. 3 is a graph showing the transient response of the base potential as a function of time in response to the transistor being switched from a conducting state to a nonconducting state.

As shown in curve E of FIG. 3, if capacitance 34 is adjusted to a value smaller than the first value thereof, there will be a time delay in the base emitter voltage $e_b$ falling to zero. As shown in curve G of FIG. 3, if capacitance 34 is adjusted to a value greater than the first value thereof, the base emitter voltage $e_b$ will overshoot the zero voltage point.

The adjustment of resistances 32 and 36 controls the rate at which charge stored in transistor 10 during a pulse is dissipated at the termination of a pulse. For many types of transistors, the step function of curve F shown in FIG. 3 may be obtained with resistors 32 and 36 set to the minimum values thereof. However, for some types of transistors, the step function shown in curve F of FIG. 3 cannot be obtained without placing a certain resistance in series with capacitance 30 and a certain resistance in series with capacitance 34.

Since the total charge to be dissipated, in this case, is equal to the sum of the first and second components of charge, and the charge across capacitance 30 is equal to the first component of charge, when capacitance 34 is adjusted to the aforesaid first value thereof, the charge thereacross is equal to the second component of charge.

If the second component of charge is designated $Q_c$, $$Q_c=C_{34}(e_g-e_b)$$

However, the signal collector capacity has been defined as equal to $$\frac{Q_c}{V_{cc}}$$

Therefore, $$C_c=C_{34}\frac{(e_g-e_b)}{V_{cc}}$$

If $V_{cc}$, which is equal to $e_g$, is much greater than $e_b$, as is usually the case, then $C_c$ is substantially equal to the first value of $C_{34}$.

For most types of transistors, it has been found that $Q_c$ is a linear function of $V_{cc}$. For those types of transistors in which $Q_c$ is a non-linear function of $V_{cc}$, a plurality of determinations of $C_c$ may be made at various $V_{cc}$ and a curve drawn of $C_c$ as a function of $V_{cc}$.

In order to determine the saturated time constant of the transistor under test at any given degree of saturation, resistance 28 is set to a second value thereof lower than the first value thereof, where the ratio of the second value of resistance 28 to the predetermined value of resistance 44 determines the degree of saturation. In addition, capacitance 30 is set to a second value thereof equal to the sum of the first value thereof and the first value of capacitance 34. Then capacitance 34 is set to a second value thereof and resistances 32 and 36 are set to values thereof such that the base emitter voltage again drops to zero in a minimum time, as shown in curve F or FIG. 3.

If the charge across capacitance 34, when it is set to the second value thereof, is designated $Q_s$, $$Q_s=C_{34}(e_g-e_b)$$

$$I_c=\frac{e_g-e_c}{R_{44}}$$

Therefore, if $t_s$ equals the saturated time constant, $$t_s=\frac{Q_s}{I_f}=\frac{C_{34}(e_g-e_b)}{\frac{e_g-e_c}{R_{44}}}$$

However, if $e_g$ is very much larger than either $e_b$ or $e_c$, as is usually the case, $t_s$ is substantially equal to $R_{44}C_{34}$, at the second value of $C_{34}$.

For a given degree of saturation, it has been found that $I_c$ is a linear function of $Q_s$. Therefore, $t_s$ is an inherent characteristic of the transistor which is independent of $I_c$. Determination of $t_s$ at various degrees of saturation may be made.

As shown, the transistor under test is NPN. It is obvious that if the transistor under test were PNP, the pulse $e_g$ and the potential $V_{cc}$ would have opposite polarities.

While there has been described what is considered to be a preferred embodiment of the invention, it is not intended that the invention be restricted thereto but that it is be limited only by the true spirit and scope of the appended claims.

What is claimed is:

1. A test circuit for measuring at least one dynamic characteristic of a transistor comprising first, second, third, and fourth terminals, means for connecting the emitter electrode of a transistor under test to said first terminal, means for connecting the base electrode of a transistor under test to said second terminal, means for connecting the collector electrode of a transistor under test to said third terminal, a calibrated adjustable first resistance connecting said fourth terminal to said second terminal, a calibrated adjustable capacitance means, means for shunting said first resistance with said capacitance means, a second resistance of predetermined value connecting said fourth terminal to said third terminal, means for applying a reference potential to said first terminal, a pulse source coupled between said first and fourth terminals for intermittently applying a potential pulse to said fourth terminal, said potential pulse having a given magnitude and a polarity to forward bias said base electrode of said transistor under test with respect to the emitter electrode thereof, the duration of said potential pulse being sufficient to permit collector current to reach a steady state value before the termination of said potential pulse, means for continuously indicating the potential of said second terminal and means for continuously indicating the potential of said third terminal, whereby when said first resistance is adjusted to a first value thereof such that during a potential pulse the steady state potential of said second terminal equals the steady state potential of said third terminal and said capacitance means is adjusted to a first value thereof such that during a potential pulse the potential of said third terminal reaches the steady state potential thereof in a minimum time without overshooting the steady state potential thereof, the unsaturated time constant of said transistor under test is equal to the product of the predetermined value of said second resistance and said first value of said capacitance means.

2. The test circuit defined in claim 1, further comprising a fifth terminal, a source of fixed potential having the same magnitude and polarity as said potential pulse, means for applying said fixed potential to said fifth terminal, and means for connecting said second resistance between said fifth and third terminals and disconnecting said second resistance from said fourth terminal, whereby when said first resistance is adjusted to said first value thereof and said capacitance means is adjusted to a second value thereof such that following the termination of a potential pulse the potential of said second electrode falls to said reference potential in a minimum time without overshooting said reference potential the difference between said second and first values of said capacitance means is proportional to the collector signal capacity of said transistor under test.

3. The test circuit defined in claim 2, wherein during a potential pulse the magnitude of the potential at said second terminal is insignificant relative to the magnitude of said fixed potential, whereby the difference between said second and first values of said capacitance means is substantially equal to said collector signal capacity.

4. The test set defined in claim 2, wherein during a potential pulse the magnitudes of the potentials at said second and third terminals, respectively, are insignificant relative to the given magnitude of said potential pulse and said fixed potential, and said first resistance is adjusted to a second value thereof which bears a given ratio with respect to the predetermined value of said second resistance which is less than the ratio which the first value of said first resistance bears with respect to the predetermined value of said second resistance, whereby when said capacitance means is adjusted to a third value thereof such that following the termination of a potential pulse the potential of said second electrode falls to said reference potential in a minimum time without overshooting said reference potential the product of said predetermined value of said second resistance multiplied by the difference between said third value of said capacitance means and the sum of said first and second values of said capacitance means is substantially equal to the saturated time constant of said transistor under test at said given ratio.

5. The test circuit defined in claim 4, wherein said means for shunting said first resistance with said capacitance means includes an adjustable third resistance in series with said first capacitance means and an adjustable fourth resistance in series with said second capacitance means.

6. The test circuit defined in claim 1, wherein said capacitance means includes calibrated adjustable first capacitance means and calibrated adjustable second capacitance means, and said means for shunting said first resistance with said capacitance means includes means for shunting said first resistance with said first capacitance means and switch means for selectively connecting said second capacitance means in parallel with said first capacitance means.

References Cited in the file of this patent

Switching Circuits: Measuring Recovery Time, Electronic Design, Nov. 11, 1959, pp. 199–203.